United States Patent [19]
Oda

[11] Patent Number: 5,342,087
[45] Date of Patent: Aug. 30, 1994

[54] AIR BAG FOR VEHICLE SAFETY DEVICE

[75] Inventor: Yoshio Oda, Kure, Japan

[73] Assignee: Mazda Motor Corporation, Hiroshima, Japan

[21] Appl. No.: 98,258

[22] Filed: Jul. 29, 1993

Related U.S. Application Data

[63] Continuation of Ser. No. 795,884, Nov. 22, 1991, abandoned.

[30] Foreign Application Priority Data

Nov. 27, 1990 [JP] Japan .................................. 2-323749

[51] Int. Cl.5 .............................................. B60R 21/20
[52] U.S. Cl. ............................. 280/728 R; 280/743 R
[58] Field of Search ............... 280/728 R, 730 R, 731, 280/732, 743 R

[56] References Cited

U.S. PATENT DOCUMENTS

| | | | |
|---|---|---|---|
| 3,887,214 | 6/1975 | Brawn | 280/730 |
| 4,235,453 | 11/1980 | Lawson et al. | 280/743 |
| 4,842,300 | 6/1989 | Ziomek et al. | 280/732 |
| 4,944,529 | 7/1990 | Backhaus | 280/743 |
| 5,022,675 | 6/1991 | Zelenak, Jr. et al. | 280/743 |
| 5,100,168 | 3/1992 | Horiuchi et al. | 280/743 |
| 5,140,799 | 8/1992 | Satoh | 280/743 |

FOREIGN PATENT DOCUMENTS

| | | | |
|---|---|---|---|
| 52-77338 | 6/1977 | Japan | 280/728 |
| 62-198547 | 9/1987 | Japan . | |
| 63-104155 | 7/1988 | Japan . | |
| 63-212147 | 9/1988 | Japan | 280/743 |
| 3-86653 | 4/1991 | Japan | 280/752 |
| 3-279055 | 12/1991 | Japan | 280/743 |

Primary Examiner—Karin L. Tyson
Attorney, Agent, or Firm—Keck, Mahin & Cate

[57] ABSTRACT

An air bag used in a vehicle air bag safety device is inflated by pressurized gas and expanded, in a lengthwise direction of the air bag, so that an occupant is contacted by the inflated air bag. The air bag is folded first in zigzag fashion into a plurality of lengthwise pleat-folds at opposite side portions of the air bag. The air bag is then folded in zigzag fashion into a plurality of transverse pleat-folds from the rear end of the air bag, remote from the housing, to the front end of the air bag.

5 Claims, 5 Drawing Sheets

AIR BAG FOR VEHICLE SAFETY DEVICE

This is a continuation of application Ser. No. 07/795,884, filed Nov. 22, 1991, abandoned.

BACKGROUND OF THE INVENTION

1. Field of the Invention

This invention relates to a vehicle safety air bag device having a folded air bag which is inflated and expands in a vehicle interior so as to protect an occupant of the vehicle against injuries during front-end collisions. Additionally, the present invention relates to a particular method of folding the air bag used in such a device.

2. Description of Related Art

In recent years, safety air bags have been installed in vehicles in order to protect occupants of the vehicles, such as a driver and a passenger seated in front seats, against injuries during a collision. For protecting an occupant of the front passenger seat, the safety air bag is typically installed behind a dashboard in front of the passenger seat of the vehicle. An inflater or gas generator generates a pressurized inert gas, and inflates and expands the air bag in the vehicle interior or compartment so as to act as a cushion on the occupant.

It is important to complete inflation and expansion of an air bag rapidly so as to provide sufficiently swift contact between the air bag and the occupant during a collision in order for the occupant to be positively restricted from moving by the inflated air bag.

Because occupants of a front passenger seat move around and vary their postures much more often than occupants of a front driver seat, a passenger seat side air bag is designed to have an inflated volume or size which is almost three times as large as the inflated volume or size of a driver seat side air bag. Therefore, a passenger seat side air bag needs a longer inflation time than does the driver seat side air bag. For this reason, an occupant of the passenger seat will often be contacted by an expanding air bag at a later time than that at which an occupant of the driver seat is contacted by the driver seat side air bag.

In order for the passenger seat side air bag to be rapidly inflated and expanded in a short time, it is possible to increase pressure of the gas supplied into the air bag. However, providing a gas under increased pressure causes the passenger seat side air bag to apply a great impact against the occupant of the front passenger seat.

SUMMARY OF THE INVENTION

It is, therefore, a primary object of the present invention to provide a vehicle safety air bag device in which an air bag can be inflated and expanded rapidly in a short time.

It is another object of the present invention to provide a useful method of folding an air bag which can be inflated and expanded rapidly in a short time.

The present invention aims to provide an air bag for a vehicle safety air bag device, having a particular folded structure, which can be inflated by pressurized gas generated by a gas generator and expanded or deployed in a lengthwise direction of the air bag. By using the particular folded structure, an occupant can be contacted by the inflating air bag more rapidly than if the air bag were to be deployed, as is conventional, in a transverse direction of the air bag.

The safety air bag device includes an air bag container or housing, with an opening formed in a vehicle dash panel or in an instrument panel, and an air bag installed in the housing. When inflated, the air bag is expanded through the opening and into the vehicle interior so that the width of the air bag is larger than a transverse width of the opening. The air bag is folded first into a plurality of pleat-folds, in zigzag fashion, at opposite side portions of the air bag. Then, the air bag is folded into a plurality of pleat-folds, in zigzag fashion, from a rear end, remote from the housing, to a front end of the air bag. A pleat-fold in the side portion of the air bag extends, in a lengthwise direction, from the front end to the rear end of the air bag. The air bag, when deflated so that the lengthwise pleat-folds are folded, has a width which is reduced so as to be as small as a transverse width of the opening for the air bag in the dash or instrument panel. When the air bag, thus folded and installed in the housing, is inflated by a pressurized gas generated by the gas generator upon a collision of the automotive vehicle, it is expanded or deployed in the lengthwise direction before it is expanded or deployed in the transverse direction. The air bag thus expands initially toward the occupant at the beginning of expansion or deployment, so that the occupant is quickly contacted by the expanding air bag upon the occurrence of a collision.

BRIEF DESCRIPTION OF THE DRAWINGS

The above and other objects and features of the present invention will be apparent from the following description of a preferred embodiment thereof when considered in conjunction with the associated drawings, in which.

DETAILED DESCRIPTION OF THE PREFERRED EMBODIMENT

Figure 1:
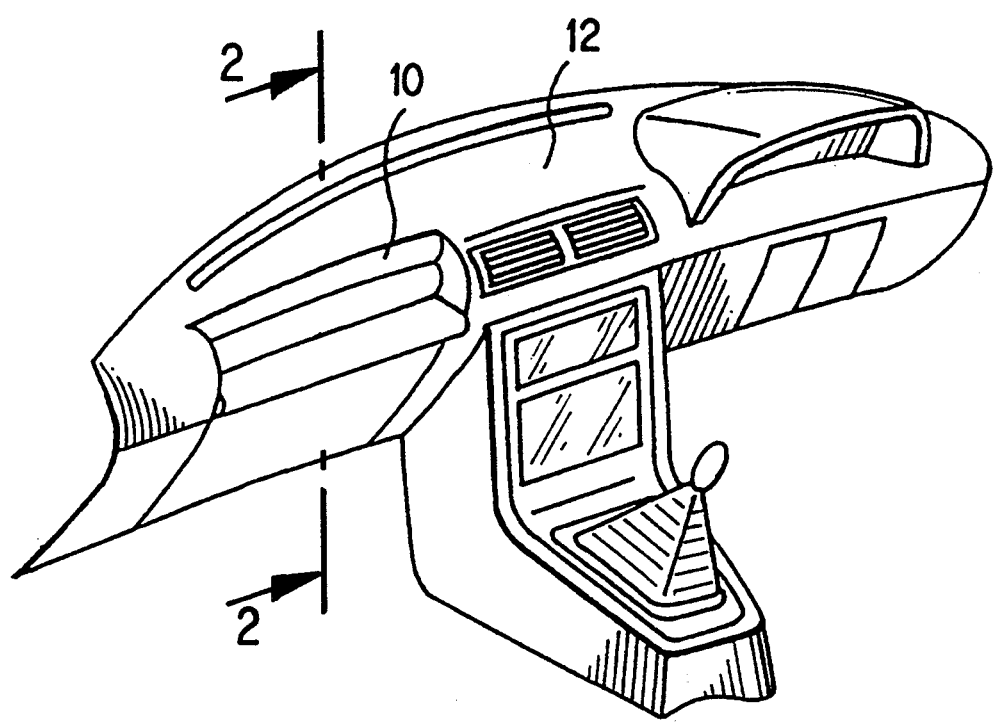
FIG. 1 is a perspective view showing the appearance of an essential part of a dash panel of a vehicle in which a safety air bag device is installed.
Figure 2:
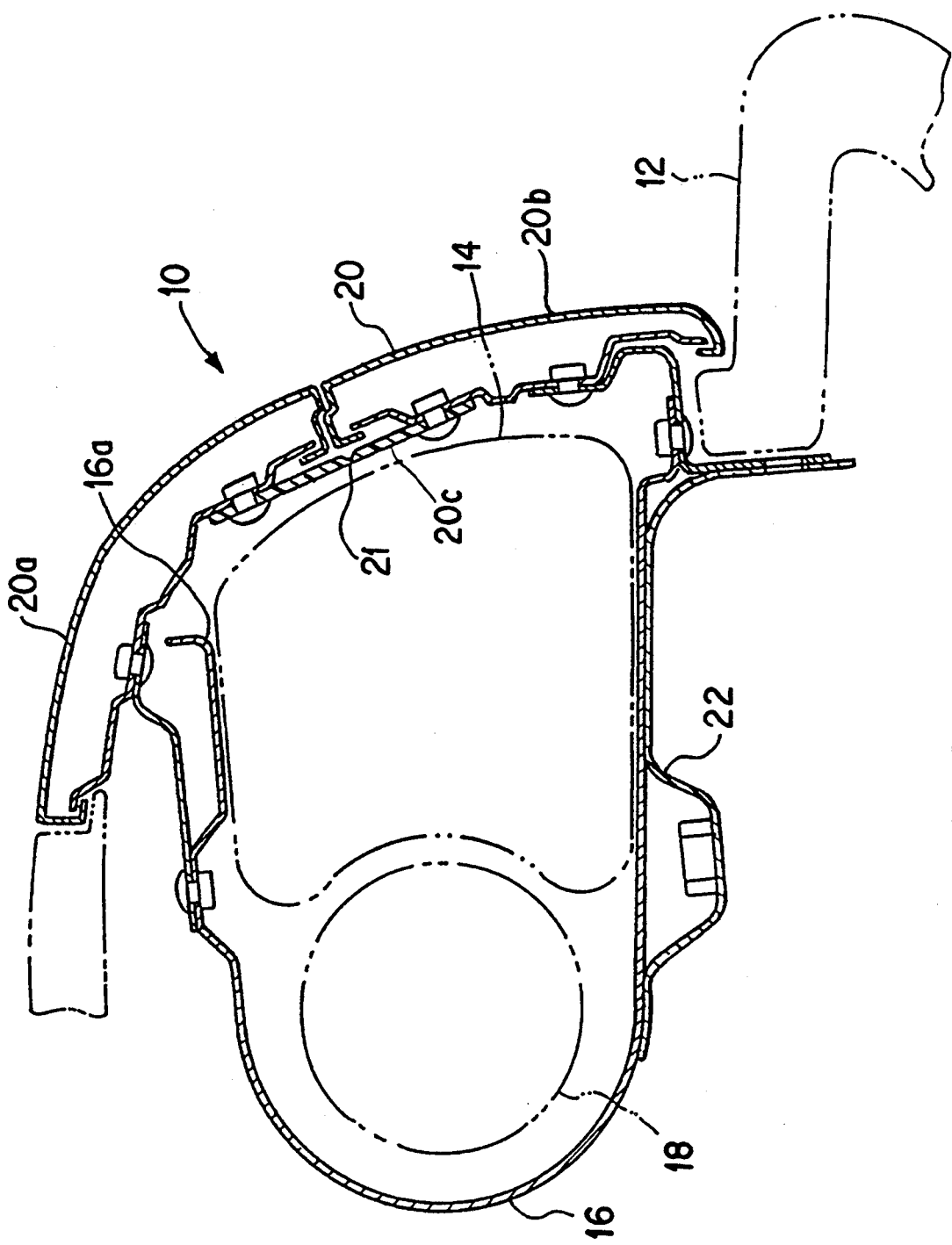
FIG. 2 is a cross-sectional view of FIG. 1, as seen along section line II—II, which shows a vehicle safety air bag device in accordance with a preferred embodiment of the present invention.

Referring to the drawings in detail and, in particular, to FIGS. 1 and 2, a safety air bag unit 10 is shown as being mounted in a vehicle dashboard or dash panel 12 by a bracket 22. The safety air bag unit 10 includes a container or housing 16, installed behind the vehicle dash panel 12, and a lid 20, having an outer surface with a profile matching the outer profile of the vehicle dash panel 12. The lid 20 is constructed to cover an opening 16a in the vehicle dash panel 12. When the safety air bag unit 10 is installed in the vehicle, the lid 20 is located in the opening 16a of the vehicle dash panel 12 and forms a part of the vehicle dash panel 12. The lid 20 comprises upper and lower outer walls 20a and 20b and an inner wall 20c connecting the upper and lower outer walls 20a and 20b together. The inner wall 20c has a "parting configuration" formed by a score line or groove 21 provided on its outside surface. The groove 21 is V-shaped, and concentrates stresses applied to the inner wall 20c so that the lid 20 separates into a pair of, or upper and lower, flaps when pressure is applied to the inside surface of the inner wall 20c. Consequently, the lid 20 is separated into upper and lower lid portions. The housing 16 encloses a folded air bag 14 and an inflater or gas generator 18.

Figure 3A:
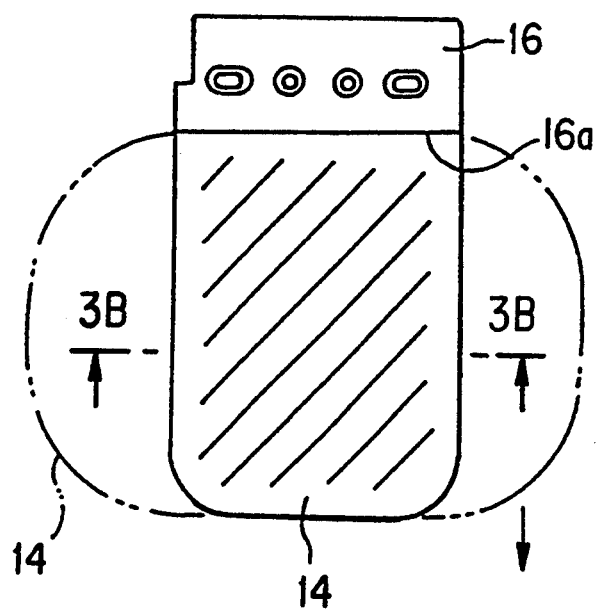
FIGS. 3A-3D are illustrations showing the manner in which the air bag is folded according to the present invention.
Figure 3B:
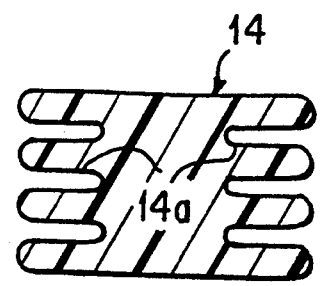
Figure 3C:
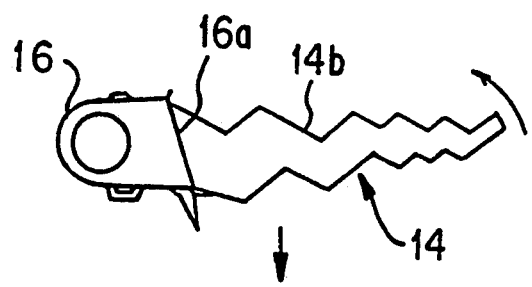
Figure 3D:
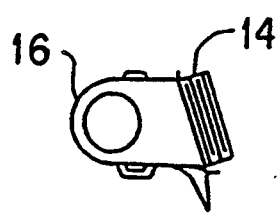

As shown in FIGS. 3A–3D, the manner in which the air bag 14 is folded is designed, in accordance with the principles of the present invention, so as to provide a plurality of pleat-folds 14a extending in a lengthwise direction of the air bag 14 in each side portion of the air bag 14. The provision of pleat-folds 14a reduces the width of the air bag 14 so that it is smaller than the transverse width of an opening 16a in a housing 16 when the air bag 14 is deflated and flattened, as FIGS. 3A and 3B show. The flattened air bag 14 is then further folded, from the rear end of the air bag 14, remote from the housing 16, to the front end of the air bag 14, into a plurality of pleat-folds 14b extending in a transverse direction of the air bag 14, as FIGS. 3C and 3D show. The completely folded air bag 14 is placed into the housing 16.

When a collision occurs, the gas generator 18 is activated by a collision sensor (not shown), which may be of any type well known in the art, and an inert gas is rapidly directed, under pressure, into the air bag 14. This forces the air bag 14 through the opening 16a and toward the vehicle dash panel 12 so that it applies pressure to the inside of the lid 20. When such pressure is applied to the lid 20, the V-shaped groove 21 enables the lid 20 to separate into upper and lower lid portions to allow the air bag 14 to expand into the vehicle compartment.

Figure 4A:
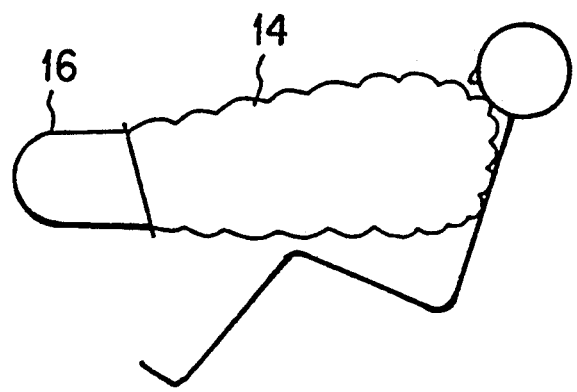
FIGS. 4A and 4B are illustrations showing expansion of an air bag which has been folded in the manner illustrated in FIGS. 3A-3D.
Figure 4B:
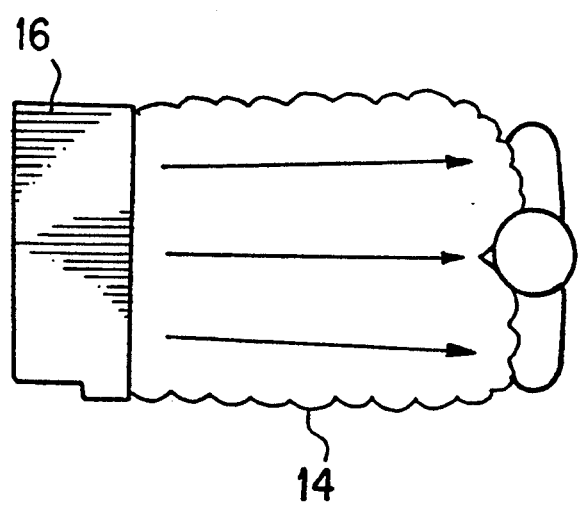

Since the air bag 14 is folded into a plurality of folds in both its direction of thickness and in its lengthwise direction, the air bag 14 is expanded first in the lengthwise direction, with its width kept almost equal to the transverse width of the opening 16a of the housing 16, as shown in FIG. 4A. The air bag 14 is then expanded in the direction of its width so as to complete inflation, as shown in FIG. 4B. The expansion of the air bag 14, therefore, takes place first in a direction toward a passenger seat occupant so that the occupant is contacted by the expanding air bag 14. In other words, the air bag expands first in the lengthwise direction, and then in its direction of width. Inflation of the air bag 14 sufficiently to provide contact of the air bag with the passenger seat occupant, therefore, can be effected in a shorter time than previously possible without any increase in gas pressure.

Figure 5:
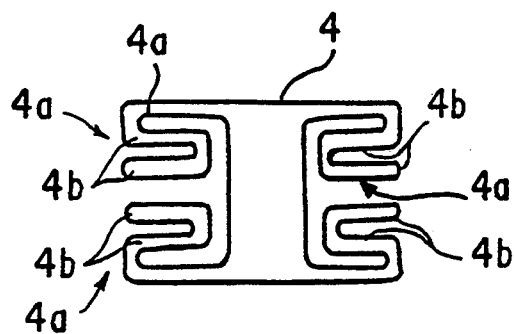
FIG. 5 is a cross-sectional view of an air bag folded in a conventional manner.
Figure 6A:
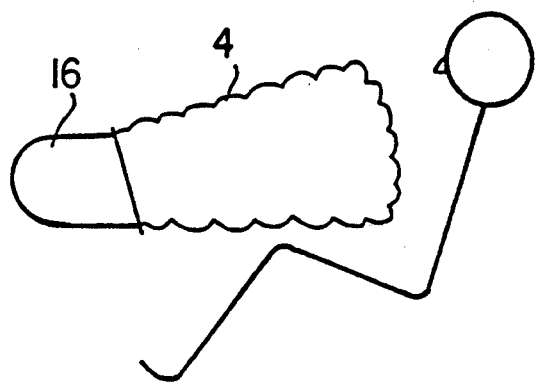
FIGS. 6A and 6B are illustrations showing expansion of an air bag which has been folded in the manner shown in FIG. 5.
Figure 6B:
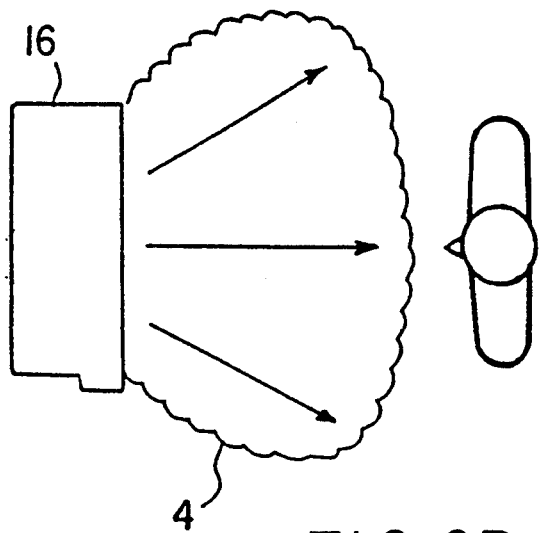

The advantage of having an air bag 14 folded in the manner described above will be more clearly understood after considering an air bag 4 folded in a conventional manner as shown in FIG. 5. The known air bag 4 is first folded so as to provide upper and lower side folds 4a, which are relatively great in length, when the safety bag 4 is deflated. The air bag 4 is then flattened in a direction of its thickness and, after folding each side fold 4a into a plurality of folds 4b, the air bag 4 is folded, in its lengthwise direction, into a plurality of folds. Each side fold 4a has a large elasticity, which tends to force the fold 4a to restore itself to its expanded state. Consequently, the air bag 4a, even though it is folded into a plurality of folds in the lengthwise direction, expands in both its transverse direction and in its lengthwise direction toward the occupant simultaneously when it is inflated. Such is shown in FIGS. 6A and 6B. Therefore, it is difficult to provide contact of the air bag 4 with the occupant in an acceptably short time during expansion of the known air bag 4.

It is to be understood that although the present invention has been described in detail with respect to a preferred embodiment thereof, various other embodiments and variants may occur to those skilled in the art. All of these other embodiments and variants which fall within the scope and spirit of the invention are intended to be covered by the following claims.

I claim:

1. A safety air bag device, for installation behind a dash panel of an automotive vehicle, comprising:
    a housing having an opening provided behind the dash panel;
    a gas generator installed in said housing for generating a pressurized gas when the automotive vehicle undergoes a collision; and
    an air bag, including a pair of opposite side portions and a pair of upper and lower surfaces extending between said opposite side portions, installed in said housing and inflatable by the pressurized gas generated by said gas generator to expand through the opening in the housing and into an interior of the automotive vehicle so that a width of said air bag is larger than a width of the opening, said air bag being folded first, in zigzag fashion, into lengthwise pleat-folds extending in a lengthwise direction of said air bag, each of said opposite side portions of said air bag including a plurality of said lengthwise pleat-folds located between said upper and lower surfaces, said lengthwise pleat-folds reducing the width of said air bag so that it is almost equal to a transverse width of the opening when said air bag is deflated and flattened, said air bag then being folded into a plurality of transverse pleat-folds disposed between a rear end of said air bag and a front end of said air bag, each of said transverse pleat-folds extending in a transverse direction, and completely across one of the upper and lower surfaces, of said air bag.

2. A safety air bag device as recited in claim 1, wherein said air bag is expanded toward a front passenger seat of the automotive vehicle.

3. A safety air bag device as recited in claim 1, and further comprising a lid having an outer surface with a profile matching an outer profile of the dash panel and constructed to cover said opening.

4. A safety air bag device as recited in claim 3, wherein said lid comprises upper and lower outer walls and an inner wall having a parting configuration formed by a groove in its outside surface, said groove being V-shaped so as to concentrate stresses and cause said lid to separate into upper and lower flaps when pressure is applied to an inside surface of said inner wall by said air bag.

5. A method of folding an air bag, including a pair of opposite side portions and a pair of upper and lower surfaces extending between said opposite side portions, into a housing having an opening formed in a dash panel of an automotive vehicle, said air bag being inflatable by pressurized gas from a gas generator and expandable through the opening so that a width of the air bag is larger than a width of the opening, said method comprising the steps of:

folding each of said pair of opposite side portions of the air bag, in zigzag fashion, into a plurality of lengthwise pleat-folds located between said upper and lower surfaces so as to reduce the width of the air bag so that it is almost equal to a transverse width of the opening when the air bag is deflated and flattened; and folding the air bag into a plurality of transverse pleat-folds disposed between a rear end of said air bag and a front end of said air bag so that each of said transverse pleat-folds extends in a transverse direction, and completely across one of the upper and lower surfaces, of said air bag.

* * * * *